June 27, 1967  F. HARDING  3,328,220
METHOD AND APPARATUS FOR MAKING PLASTIC BAGS
Filed June 4, 1963  3 Sheets-Sheet 3

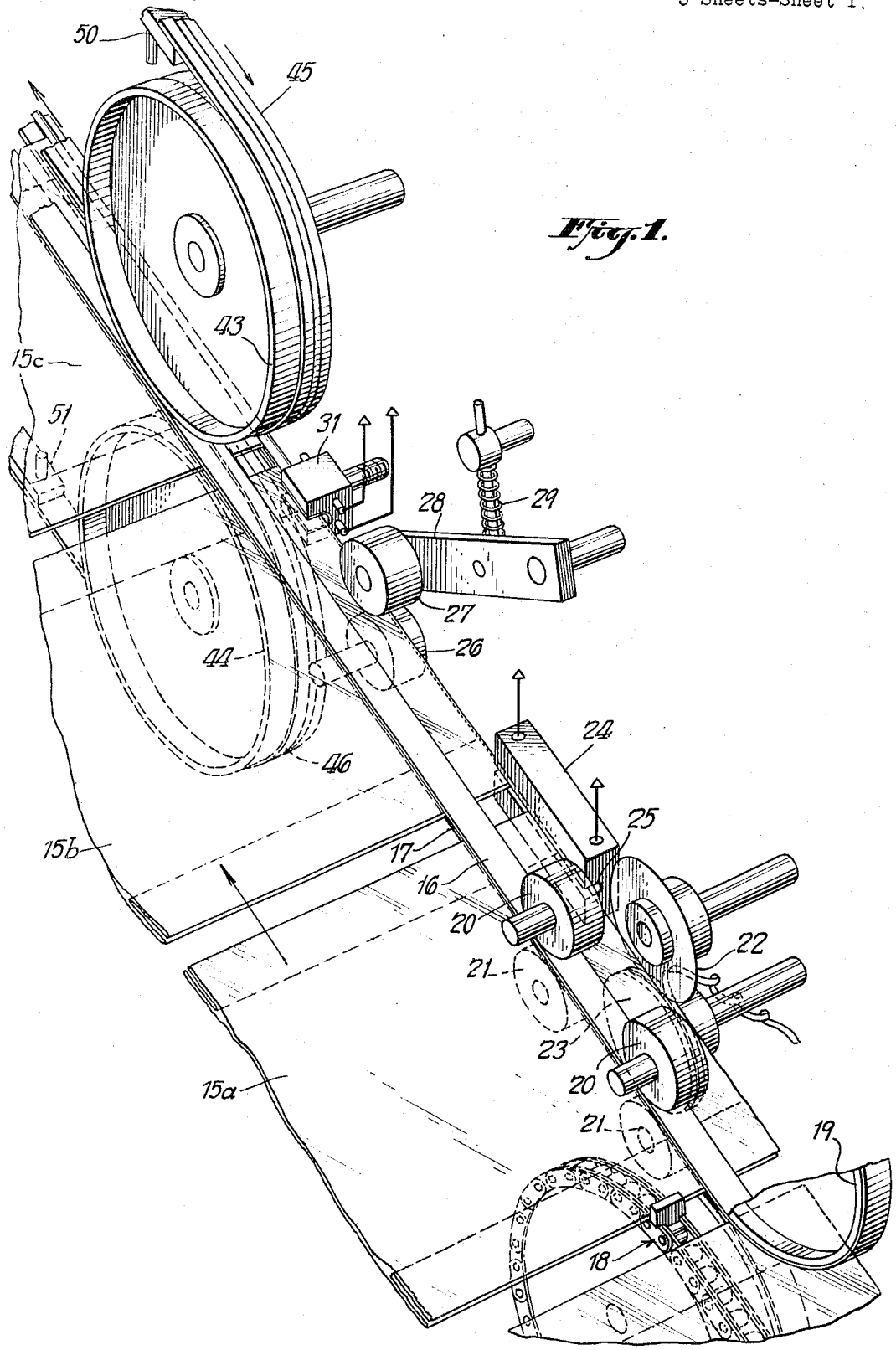

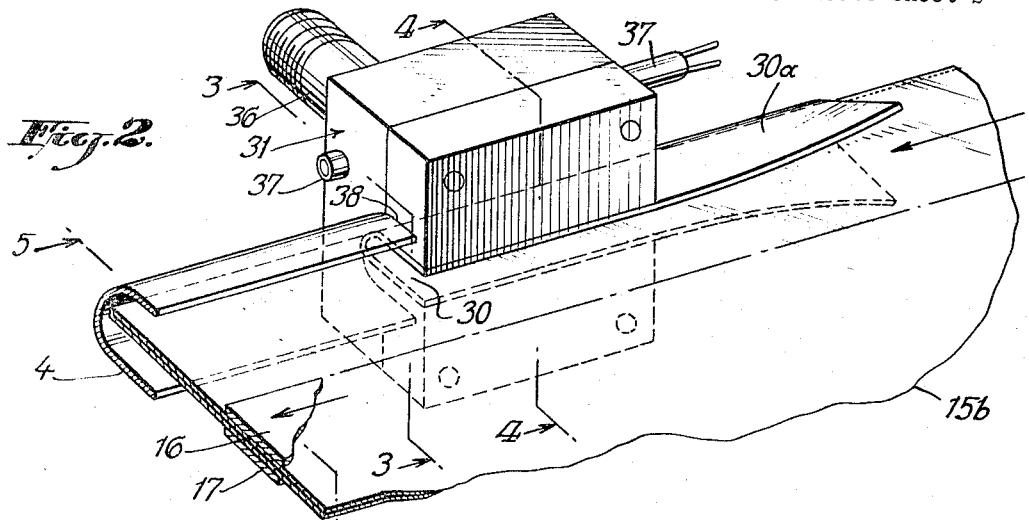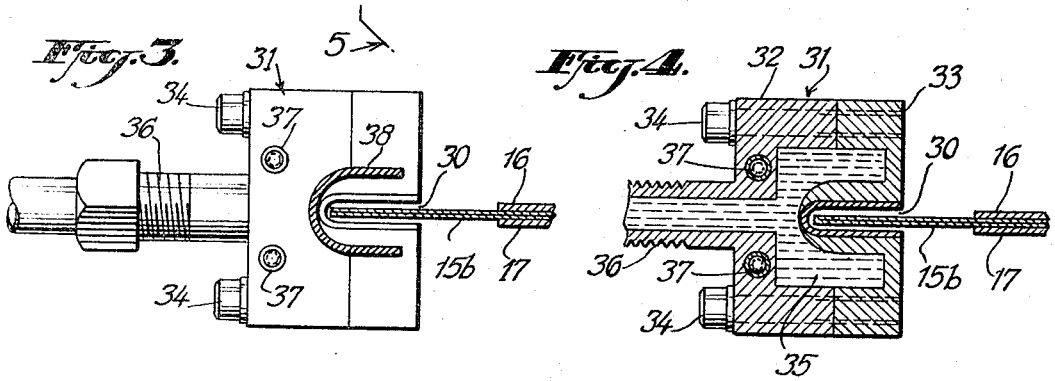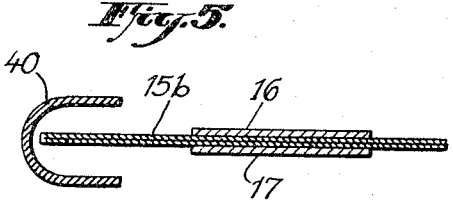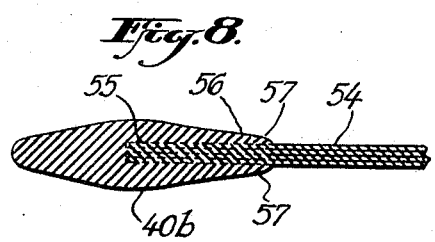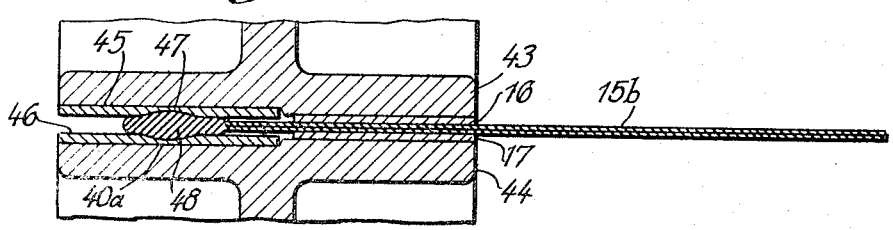

United States Patent Office 3,328,220
Patented June 27, 1967

3,328,220
METHOD AND APPARATUS FOR MAKING PLASTIC BAGS
Francis Harding, Pensacola, Fla., assignor to St. Regis Paper Company, New York, N.Y., a corporation of New York
Filed June 4, 1963, Ser. No. 285,317
5 Claims. (Cl. 156—202)

This invention relates to methods and apparatus for making containers such as plastic bags and the like and more particularly, improved forms of sealed end closures therefor, certain aspects of the resulting product being disclosed and claimed in copending application Ser. No. 293,005, filed July 5, 1963, by applicant herein, now U.S. Patent No. 3,221,789, granted Dec. 7, 1965.

The invention, among other possible uses, is particularly adapted for sealing the end closures of heavy duty bags or shipping sacks such as formed for example of a single ply of polyethylene film or other suitable flexible thermoplastic sheet material formed into a length of flattened tubing, the end edges of the opposite faces of which are brought flatwise together and sealed. Such flattened tubular plastic bag lengths may be formed on tubing machines such as used for forming multiwall paper shipping sacks, for example, but suitably adjusted and arranged for receiving and tubing bags having one or more walls of such plastic material. Such plastic bags may be formed with gussets along the sides, and also, if desired, after the bag lengths have been formed, one corner may be folded in to form a valve including, if desired, a valve extension sleeve, the folds of the plastic material being like or similar to those conventionally used in forming multiwall paper valve bags particularly of the sewn end type.

While the ends of such bag tubes of thermoplastic material may be closed and sealed by bringing the end edges together under heat and pressure, this does not ordinarily provide by itself a sealed closure of adequate strength such as desirable for shipping sacks, inasmuch as the heat applied, if sufficient in effect to weld the plastic surfaces together, may detract from the strength of the plastic film at or adjacent the edges. Also, various methods have been heretofore proposed for closing and sealing the end edges of similar bag tubes of paper or other material by the use of various forms of tape means applied and secured astride the end edges, but such methods involve difficulties in securing a closure of adequate strength and securely sealed against leakage, particularly at areas along the ends of the gussets and along the top edge of the valve portion, where the end edges of the faces of the bag not only have to be sealed together, but also the end edges of the intervening layers of the gussets, and valve and valve sleeve portions, have to be secured to each other and to the face surfaces of the bag end edges.

With the present invention, these difficulties are overcome by preliminarily sealing together the end edges under heat and pressure, preferably after trimming same to assure that the various layers thereof will be coterminous at the gusset and valve portions, as well as elsewhere. While this preliminary heat sealing of the edges will insure that same are sealed and held together temporarily, the strength of this seal will not ordinarily be adequate, particularly when the bag becomes filled so that its walls are bulged apart. Hence as a next step, in accordance with the present invention, an extruded strip of hot thermoplastic material such as polyethylene, is applied astride the preliminarily sealed end edges. Such strip is preferably extruded so as to have a generally U-shaped cross-section positioned astride, but not initially contacting, the bag end surfaces. But the strip is advanced along with the advance of the end edges of the bag in such a manner that the strip becomes somewhat attenuated and so that it assumes a substantially crescent-shaped cross-section, that is, a cross-section such that its midportion, which is then brought into contact with the end edges of the bag, is relatively thick, whereas the edges of the strip which respectively are to be brought into contact with the surfaces near the bag end edges, will assume a tapered or thinner cross-section similar to the pointed portions of a crescent. The bag ends, with the hot plastic strip thus applied, are then advanced and brought under pressure, for example by passing same through the nip of two rollers upon which cooled metal bands are positioned to engage respectively the upper and lower surfaces of the end closure, these bands being formed with shallow grooves, preferably of arcuate cross-section. The bands are kept cool so as to solidify the plastic end closure strip in embracing relation to the previously sealed end edges and in a form such that its cross-section will be generally that of the shape of a teardrop.

Such a cross-sectional shape of the plastic closure will insure that, at the very region of the end edges of the bag, a strong, bulging formation of the plastic occurs and the plastic will extend beyond such edges to provide a rounded, somewhat tapered, protective portion for the edges. But where the plastic engages the front and back surfaces of the plastic sheet of the bag along near the end edges, the plastic tape edges will taper down to a considerably thinner condition where same will become rapidly cooled without danger of diminishing the strength of the plastic of the wall surfaces, as would occur if same become heated sufficiently to become softened or melted. Yet, at the very end edges of the plastic film or sheet, where the plastic closure bulges more, such end edges will become softened to an extent so as to become substantially integral with the material of the plastic closure.

It will be apparent that the invention in various of its aspects may be used for securing or sealing together edges of flexible thermoplastic film or sheet material for various purposes other than bag ends.

Various further and more specific objects, features and advantages of the invention will appear from the description given below, taken in connection with the accompanying drawings, illustrating by way of example a preferred form of the invention.

In the drawings:

FIG. 1 is a somewhat schematic perspective view illustrating the principal features of a preferred form of apparatus which may be used for practicing the invention in forming the sealed end closures on a series of plastic bag ends as same are being advanced, it being understood that similar equipment may be applied to the opposite ends of the bags for sealing same if they are of the valve bag type on which end closures are to be formed on both ends;

FIG. 2 is a perspective view showing means for extruding the plastic closure strip onto a bag end which is shown as passing through the extruder;

FIGS. 3 and 4 respectively are sectional views taken substantially along lines 3—3 and 4—4 of FIG. 2;

FIG. 5 is a sectional view taken along line 5—5 of FIG. 2;

FIG. 6 is a sectional view taken at a point subsequent to that of FIG. 5 and showing the manner in which the plastic end closure strip becomes attenuated to a substantially crescent-shaped cross-section;

FIG. 7 is a sectional view showing the manner in which the bag end closure is finally subjected to pressure and cooling between cooled belts, such as above mentioned;

FIG. 8 is a sectional view of a finished sealed end closure, this view being taken, for example, at a point where the four layers of film of a gusset portion of the bag end are sealed together;

Figure 9:
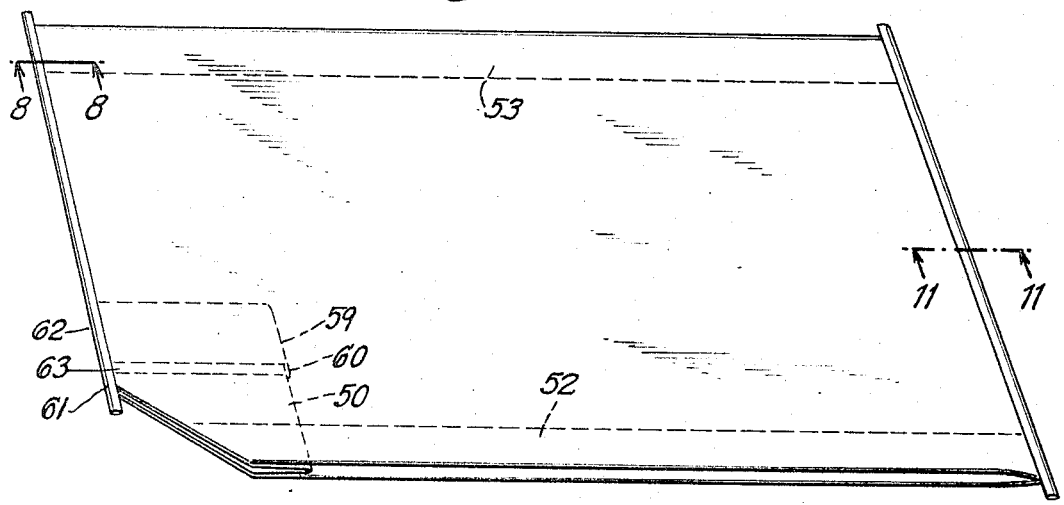
FIG. 9 is a perspective view of the finished plastic bag of the valved and gusseted type with end closures formed in accordance with the invention.

Referring now to FIG. 1 in further detail, there is here shown a series of thermoplastic bag ends as at 15a, 15b and 15c, as same are being advanced side-by-side, with their gusseted edges in slightly-spaced relation. The bags may be advanced by suitable conveying means of known type, which is not shown except that upper and lower belt portions thereof as at 16, 17 are shown engaging the upper and lower surfaces of the bag ends respectively for retaining same in flattened condition as they are being advanced from a suitable known type of feeding means, portions of which are indicated at 18. Such belts may be guided or held in place by suitable means such as indicated at 19, and upper and lower rollers, two pairs of which are indicated at 20 and 21.

As the bags first enter this equipment, the end edge portions of the plastic tubing are first preferably trimmed off as by suitable rotatably-driven trimming means as indicated at 22, 23, so that such end edges will all be accurately coterminous. The edges then advance through suitable electrical heating means, as indicated at 24, formed with a channel 25, within which the very end edges are heated in passing therethrough, to a temperature such that same will become plastic to the extent of becoming adhered to each other under pressure as they advance through the nip of a pair of pressure rollers 26, 27, the latter being carried, for example, on an arm 28, under downward pressure from a spring 29.

The bag ends, as thus preliminarily sealed, then pass through a channel as at 30, formed in a plastic extruder 31, which is more fully shown in FIGS. 2–4 inclusive. This extruder may comprise a body portion formed of separable parts as at 32, 33, held together as by bolts as at 34, and having an internal cavity as at 35, into which molten plastic material such as polyethylene is introduced as through a conduit 36. The body of the extruder may be maintained in heated condition as by electrical resistance heaters, as at 37 and at a suitable temperature, for example about 500° F., in case the plastic material being extruded is polyethylene.

Suitable guide means as at 30a may be provided, if desired, for insuring that the bag ends will properly be directed into the channel 30.

The chamber 35 has an outlet die portion at 38, preferably of a generally U-shaped configuration, as shown, with its two branches spaced respectively above and below channel 30.

Thus a hot thermoplastic strip of U-shaped cross-section, as indicated at 40, is continuously extruded from such die so as to travel along the end edges of the successive bags in the relationship shown in FIG. 5.

The plastic material in the extruder should be maintained under such pressure that the strip 40 will be extruded at a speed about equal to that of the speed of travel of the bag ends and under sufficient tension to be taut. The plastic strip will be in such a softened plastic condition, that its edges will become attenuated to tapered cross-sections, substantially as indicated at 41 in FIG. 6, whereas the mid-portions of the strip will tend to bulge or become more thickened, as indicated at 42.

Thereupon the bag ends, with the plastic strip astride same, will pass into the nip of a pair of rollers, as indicated at 43, 44 (see FIGS. 1 and 7), upon which are carried metal belts 45, 46, formed for example of steel. These belts are preferably formed along their mid-portions with grooves as at 47, 48, of shallow, arcuate-shaped cross-section (see FIG. 7). Thus, in travelling into the nip of these belts, the plastic end closure is subjected to pressure so as to assume a cross-sectional shape substantially such as shown at 40a in FIG. 7 or finally generally of the shape as shown at 40b in FIG. 8.

The belts 45 and 46 are preferably maintained in a cold or chilled condition as by applying thereto suitable fluid cooled devices, as indicated at 50, 51. Also, if desired, suitable cooling means may be applied to the plastic closure 40a, just after it leaves the region of the rollers 44, 45.

A finished single-wall plastic bag of the valve bag type is shown in FIG. 9, having gusset portions 52, 53 at the edges thereof, where, of course, the end edges will normally have four thicknesses, such as indicated at 54 in FIG. 8, which is a cross-sectional view taken, for example, along line 8—8 of FIG. 9. The very edge portions of these layers, as indicated at 55 in FIG. 8, will be more or less merged integrally of the plastic end closure, as there shown at 40b. This is because the plastic layers will have become heated together with the adjacent masses of the end closure sufficiently to become thus merged. Portions, as at 56, of the plastic layers, spaced somewhat back away from the edges, will have retained their identity more definitely, inasmuch as here the hot plastic end closure portions as applied are tapered down so as to become thinner, as indicated at 57, whereby same do not impart sufficient heat to the plastic layers to cause same to become molten or diminished in strength.

As further shown in FIG. 9, the bag may have an inturned valve corner portion as at 58, formed by folding in a so-called "notched" valve corner of the plastic tube along valve fold lines such as are common in multiwall paper valve bags. Also, as indicated, the valve may have an internal plastic sleeve extension, as at 59, suitably secured, as by heat sealing or otherwise, at 60, to the inner edges of the valve portions. As a consequence of providing such valve parts, the end edges at the region indicated at 61 in FIG. 9, will comprise in all, four layers, which will become sealed to each other and sealed and secured together in a manner the same as shown in FIG. 8. Similarly, in the region indicated at 62, because of the end edges of the valve sleeve, there will also be four layers, and if the sleeve is adhered to the inner edge of the valve by overlapping, then at the region indicated at 63, there will be six layers within the plastic end closure, all similarly sealed together.

It will be understood that after the bag ends have passed the rollers 45, 46 and the belts thereon, the continuous strip, forming the end closure on successive bags, may be severed at points between successive bags by the use of known equipment, such as used for severing the closure tapes of sewn end paper multiwall bags.

Figure 10:
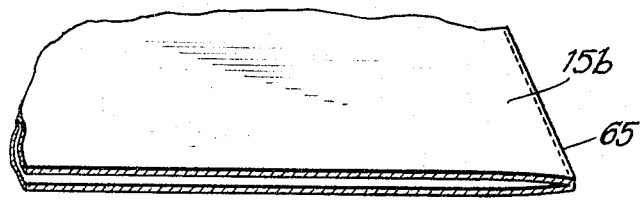
FIG. 10 is a view partly in section and broken away, illustrating the form of the preliminary seal of the end edges.
Figure 11:
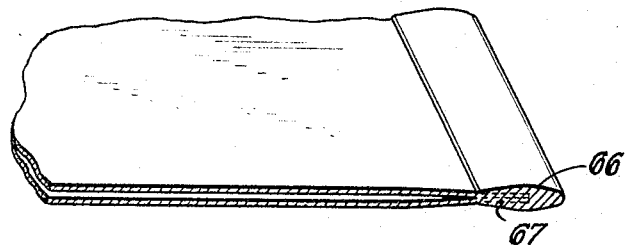
FIG. 11 is a similar sectional view, taken for example along the line 11—11 of FIG. 9 and showing in section the completed sealed end.

FIG. 10 illustrates an end portion 65 of the plastic bag in the condition which it will have in its condition just after it has passed the pressure rollers 26, 27, for example, and where it is in its condition just after it has passed such rollers for forming the preliminary seal. FIG. 11 shows at 66 a typical sectional view of the end closure as applied at a region where there are two thicknesses at the bag end which have become sealed and merged more or less integrally together as indicated at 67.

Figure 12:
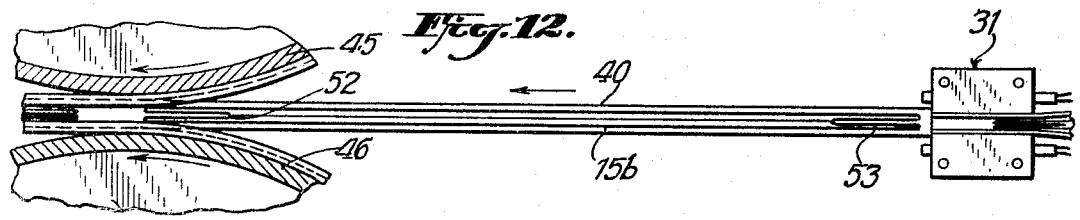
FIG. 12 is a side view showing the relationship of the extruding means and the cooling belt means with the bag end passing therebetween while the plastic closure is being brought into position thereon.

The extruder 31, the belts 45, 46 and a bag end 15b in the process of being sealed, will have the relationship shown in FIG. 12, where the plastic strip is also indicated at 40. It should be noted that the distance between the extruder and the nip of the belts, as here shown, should preferably be adjustable so as to assure that the plastic closure 40 will have opportunity to assume the cross-sectional shape as shown in FIG. 6, before same is engaged at the nip of the belts, and so as to insure further that at the same time the plastic will still be heated to a temperature sufficient so that it will become properly shaped and strongly adhered to the bag ends by the pressure at the nip of the belts.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for closing and sealing the ends of thermoplastic bag tubes and the like which comprises: bringing the opposed wall surfaces thereof at their end edges together in superposed relation; trimming such edges to coterminous condition; then heating the superposed end edges to a sufficient temperature and subjecting to pressure to form a preliminary seal therebetween; extruding a strip of hot thermoplastic material of substantially U-shaped cross-section to extend along astride of, but not initially pressed against, the thus-preliminarily sealed edge portions, while longitudinally advancing said edges and strip and while maintaining the strip substantially taut, and same becomes attenuated in a manner such that the edges thereof which are positioned respectively opposite the bag end surfaces assume a relatively thin and tapered cross-section, and the mid-portion of the strip assumes a relatively thicker cross-section; and continuing the advance of said ends while bringing the hot strip into embracing sealed relation to said end edges and the closely adjacent surfaces, by application under pressure, of opposed cool belts having shallow longitudinal grooves, thereby forming a securely sealed end closure integral with said end edges and which is substantially of the shape of a teardrop in cross-section.

2. Method for closing and sealing the ends of thermoplastic bag tubes and the like which comprises: bringing the opposed wall surfaces thereof at their end edges together in superposed relation; then heating the superposed end edges to a sufficient temperature and subjecting to pressure to form a preliminary seal therebetween; extruding a strip of hot thermoplastic material of substantially U-shaped cross-section to extend along astride of, but not initially pressed against, the thus-preliminarily sealed edge portions, while longitudinally advancing said edges and strip and attenuating the strip in a manner such that the edges thereof which are positioned respectively opposite the bag end surfaces assume a relatively thin and tapered cross-section, and the mid-portion of the strip assumes a relatively thicker cross-section; continuing the advance of said ends while bringing the hot strip under pressure into embracing sealed relation to said end edges and the closely adjacent surfaces; and cooling the strip, thereby forming a securely sealed end closure integral with said end edges, such pressure being applied by means shaped to impart to said strip a shape which is substantially of the shape of a teardrop in cross-section.

3. Method for closing and sealing the ends of thermoplastic bag tubes and the like which comprises: bringing the opposed wall surfaces thereof at their end edges together in superposed relation; extruding a strip of hot thermoplastic material of substantially U-shaped cross-section to extend along astride of said edge portions, while longitudinally advancing said edges and strip and attenuating the strip to a substantially crescent-shaped cross-section; and continuing the advance of said ends while bringing the hot strip under pressure into embracing sealed relation to said end edges and the closely adjacent surfaces thereto, thereby forming a securely sealed end closure integral with said ends, such pressure being applied by means shaped to impart to said strip a shape of a cross-section which is substantially of the shape of a teardrop.

4. Apparatus for closing and sealing the end edges of bags formed of lengths of flattened tubing of thermoplastic sheet material, such apparatus comprising in combination: means for conveying a succession of the bags with the end edges thereof substantially in alignment, and with the edges of each of the wall surfaces of each bag in superposed relation; means for trimming such superposed edges to coterminous condition as same are advanced; means for then heating such end edges; a pair of pressure rollers through the nip of which the heated edges are then passed to preliminarily seal same together; means for extruding a substantially U-shaped plastic strip in a position to extend along astride the moving bag ends; a pair of rollers spaced from said extruding means and through the nip of which the bag ends are conveyed, said rollers having thereon belts which are position to engage said plastic strip on its opposite surfaces for compressing said strip into embracing relation with the bag ends, said belts being formed with shallow longtudinally-extending grooves within which portions of said strip are received; and means for maintaining said belts in cooled condition.

5. Apparatus for closing and sealing the end edges of bags formed of lengths of flattened tubing of thermoplastic sheet material such apparatus comprising in combination: means for conveying a succession of the bags with the end edges thereof substantially in alignment, and with the edges of each of the wall surfaces of each bag in superposed relation; means for then heating the superposed end edges; means for then applying pressure to the heated edges to preliminarily seal same together; means for extruding a substantially U-shaped plastic strip in a position to extend along astride the moving bag ends; and a pair of rollers spaced from said extruding means and through the nip of which the bag ends are conveyed, and said rollers having thereon belts formed with longitudinally grooved surfaces which are positioned to engage said plastic strip on its opposite surfaces for compressing same into embracing relation with the bag ends.

References Cited

UNITED STATES PATENTS

| | | | |
|---|---|---|---|
| 2,584,633 | 2/1952 | Southwick | 156—216 X |
| 2,696,865 | 12/1954 | Seiler | 156—244 |
| 2,979,113 | 4/1961 | Stageberg | 156—500 |
| 3,050,235 | 8/1962 | Thomson | 229—62.5 |
| 3,051,605 | 8/1962 | Stannard | 156—244 |
| 3,081,213 | 3/1963 | Chinn | 156—244 |
| 3,102,676 | 9/1963 | Danelli et al. | 229—62.5 |
| 3,239,402 | 3/1966 | Ecklund et al. | 156—200 |

EARL M. BERGERT, *Primary Examiner.*

T. R. SAVOIE, *Assistant Examiner.*